(12) United States Patent
Bickham et al.

(10) Patent No.: US 7,603,015 B2
(45) Date of Patent: Oct. 13, 2009

(54) OPTICAL FIBER WITH LARGE EFFECTIVE AREA

(75) Inventors: Scott Robertson Bickham, Corning, NY (US); Dana Craig Bookbinder, Corning, NY (US); Xin Chen, Corning, NY (US); Ming-Jun Li, Horseheads, NY (US); Snigdharaj Kumar Mishra, Wilmington, NC (US); Daniel Aloysius Nolan, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 13 days.

(21) Appl. No.: 12/070,845

(22) Filed: Feb. 21, 2008

(65) Prior Publication Data

US 2008/0304800 A1 Dec. 11, 2008

Related U.S. Application Data

(60) Provisional application No. 60/926,966, filed on Apr. 30, 2007, provisional application No. 60/904,133, filed on Feb. 28, 2007.

(51) Int. Cl.
*G02B 6/02* (2006.01)
*G02B 6/36* (2006.01)
(52) U.S. Cl. .................. 385/127; 385/126
(58) Field of Classification Search .......... 385/123–128
See application file for complete search history.

(56) References Cited

U.S. PATENT DOCUMENTS

| | | | |
|---|---|---|---|
| 6,266,467 B1 | 7/2001 | Kato et al. | 385/123 |
| 6,301,422 B1 | 10/2001 | Li | 385/127 |
| 6,477,305 B1 | 11/2002 | Berkey et al. | 385/123 |
| 6,625,359 B1 | 9/2003 | Nouchi et al. | 385/123 |
| 6,904,772 B2 | 6/2005 | Berkey et al. | 65/412 |

(Continued)

FOREIGN PATENT DOCUMENTS

WO WO00/52507 9/2000

(Continued)

OTHER PUBLICATIONS

"Single Mode Fiber Optics", Jeunhomme, pp. 39-44, Marcel Dekker, New York, 1990.

(Continued)

*Primary Examiner*—Daniel Petkovsek
(74) *Attorney, Agent, or Firm*—Svetlana Z. Short

(57) ABSTRACT

An optical fiber comprising: a glass core extending from a centerline to a radius $R_1$; a glass cladding surrounding and in contact with the core, the cladding comprising: a first annular region extending from $R_1$ to a radius $R_2$, the first annular region comprising a radial width, $W_2=R_2-R_1$, a second annular region extending from $R_2$ to a radius $R_3$, the second annular region comprising a radial width, $W_3=R_3-R_2$, and a third annular region extending from $R_3$ to an outermost glass radius $R_4$; wherein (i) the core comprises a maximum relative refractive index, $\Delta_{1MAX}$, relative to the third annular region; (ii) wherein the first annular region comprises a radial width $W_2$; and (iii) the second annular region comprises a minimum relative refractive index, $\Delta_{3MIN}$, relative to the third annular region wherein $\Delta_{1MAX}>\Delta_{2MAX}>\Delta_{3MIN}$, and $\Delta_{2MIN}>\Delta_{3MIN}$; and the core and the cladding provide a fiber with cable cutoff less than 1500 nm, dispersion at 1550 nm less than 12 ps/nm/km, effective area at 1550 nm greater than 60 $\mu m^2$, and preferably greater than 70 $\mu m^2$. The second annular cladding region may contain a plurality of randomly dispersed holes.

21 Claims, 3 Drawing Sheets

U.S. PATENT DOCUMENTS

| | | | |
|---|---|---|---|
| 7,106,934 B1 * | 9/2006 | Mishra | 385/127 |
| 7,164,835 B2 * | 1/2007 | Matsuo et al. | 385/127 |
| 7,505,660 B2 * | 3/2009 | Bickham et al. | 385/125 |
| 2005/0244120 A1 * | 11/2005 | Mishra | 385/127 |
| 2006/0039665 A1 | 2/2006 | Matsuo et al. | 385/127 |

FOREIGN PATENT DOCUMENTS

| | | |
|---|---|---|
| WO | WO01/47822 | 7/2001 |
| WO | WO02/27367 | 4/2002 |
| WO | WO2008/027336 | 3/2008 |
| WO | WO2008/027351 | 3/2008 |

OTHER PUBLICATIONS

"Analysis of Curved Optical Waveguides by Conformal Transformation", Heiblum, Harris, IEEE Journal of Quantum Electronics, vol. QE-11, No. 2, Feb. 1975, p. 75-83.

* cited by examiner

OPTICAL FIBER WITH LARGE EFFECTIVE AREA

This application claims the benefit of U.S. Provisional Application No. 60/926,966 filed Apr. 30, 2007, entitled "Optical Fiber with Large Effective Area" and U.S. Provisional Application No. 60/904,133, filed Feb. 28, 2007, entitled "Optical Fiber with Large Effective Area".

BACKGROUND OF THE INVENTION

1. Field of the Invention

The present invention relates generally to optical fiber, and particularly to low and medium dispersion optical fibers suitable for dense wavelength division multiplexing.

2. Technical Background

Optical fibers such as medium dispersion fibers (MDF) with dispersion between about 6 to 12 ps/nm/km at a wavelength of 1550 nm are suitable for dense wavelength division multiplexing (DWDM). These dispersion fibers (MDFs) typically have a central core 10, with a central inner core region 11, a positive refractive index annular ring 12. The core sometimes includes at least one depressed index region 14 adjacent to the ring. The core is a fiber region containing at least 90% of signal light. These MDFs provide 6 to 12 ps/nm/km but can have an effective area of no more than 60 µm², and are relatively expensive to manufacture due to tight tolerance and core design complexity.

Optical fibers such as medium dispersion fibers (MDF) utilized in so-called "dense wavelength division multiplexing conditions" can be subjected to a variety of bending environments, in a manner which induces bend losses in optical signals transmitted through the optical fiber. Some applications that can impose physical demands, such as tight bend radii, compression of optical fiber, etc., that induce bend losses include the deployment of optical fiber in optical underground cable assemblies, buckling induced by large temperature variations, and small bend radius multiports located in cabinets that connect feeder and distribution cables.

SUMMARY OF THE INVENTION

According to one aspect of the present invention to one aspect of the present invention an optical fiber comprises:

a glass core extending from a centerline to a radius $R_1$;

a glass cladding surrounding and in contact with the core, the cladding comprising:

a first annular region extending from a radius $R_1$ to a radius $R_2$, the first annular region comprising a radial width, $W_2=R_2-R_1$, a second annular region extending from the radius $R_2$ to a radius $R_3$, and comprising a radial width, $W_3=R_3-R_2$, and a third annular region surrounding the second annular region and extending from the radius $R_3$ to an outermost glass radius $R_4$;

wherein the core comprises a maximum relative refractive index, $\Delta_{1MAX}$, relative to the third annular region; wherein said first annular region comprises index delta $\Delta_2(r)$ relative to the third annular region %; the second annular region comprises a minimum relative refractive index, $\Delta_{3MIN}$, relative to the third annular region;

wherein $\Delta_{1MAX} > \Delta_{2MAX} > \Delta_{3MIN}$, and $\Delta_{2MIN} > \Delta_{3MIN}$ and $\Delta_{3MIN} < -0.025$; and wherein the core and the cladding provide a fiber with cable cutoff less than 1500 nm, dispersion at 1550 nm less than 12 ps/nm/km, and an effective area at 1550 nm greater than 60 µm².

According to one embodiment an optical fiber comprises: a glass core extending from a centerline to a radius $R_1$; a glass cladding surrounding and in contact with the core, the cladding comprising: (i) a first annular region extending from a radius $R_1$ to a radius $R_2$, the inner region comprising a radial width, $W_2=R_2-R_1$, (ii) a second annular region extending from the radius $R_2$ to a radius $R_3$, the second annular region comprising a radial width, $W_3=R_3-R_2$, and (iii) a third annular region extending from the radius $R_3$ to an outermost glass radius $R_4$;

wherein the core comprises a maximum relative refractive index, $\Delta_{1MAX}$, relative to the third annular region, and $0.2\% < \Delta_{1MAX} < 0.8\%$;

wherein the first annular region comprises a radial width, $W_2$ such that $W_2 > \frac{2}{3}R_1$, and a refractive index delta $|\Delta_2(r)| < 0.025\%$;

wherein the second annular region comprises:

a minimum relative refractive index, $\Delta_{3MIN}$, relative to the third annular region, wherein $\Delta_{3MIN} < -0.3\%$;

wherein $\Delta_{1MAX} > \Delta_{2MAX} > \Delta_{3MIN}$, and $\Delta_{2MIN} > \Delta_{3MIN}$; and wherein the core and the cladding provide a fiber with cable cutoff less than 1500 nm, dispersion at 1550 nm less than 12 ps/nm/km, and effective area at 1550 nm greater than 60 µm².

In one set of embodiments, the second annular region comprises silica glass having a dopant selected from the group consisting of germanium, aluminum, phosphorus, titanium, boron, and fluorine.

In another set of embodiments, the second annular region comprises silica glass with a plurality of closed holes, the holes being either empty (vacuum) or gas filled, wherein the holes provide internal reflection of light, thereby providing wave guiding to light traveling along the core. Such holes can provide an effective refractive index which is low, e.g. compared to pure silica.

Reference will now be made in detail to the present preferred embodiments of the invention, examples of which are illustrated in the accompanying drawings.

DETAILED DESCRIPTION OF THE PREFERRED EMBODIMENT

Figure 1A:
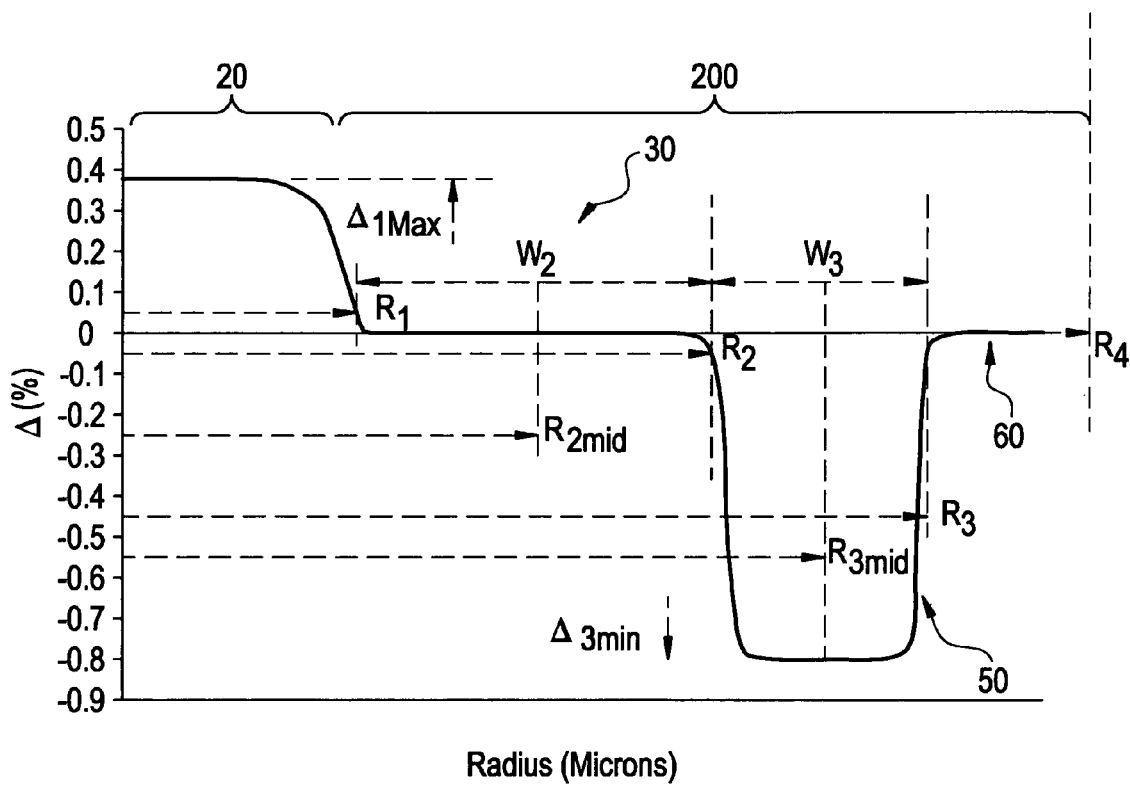
FIG. 1A shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the third annular region 60 (outer region) of the cladding. As used herein, the relative refractive index is represented by $\Delta$ and its values are given in units of "%", unless otherwise specified. In cases where the refractive index of a region is less than the average refractive index of the third annular region 60, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi (\int f^2 r dr)^2 / (\int f^4 r dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, $2w = MFD$, and $w^2 = (2 \int f^2 r \, dr / \int [df/dr]^2 r \, dr)$, the integral limits being 0 to $\infty$.

The bend resistance of a waveguide fiber can be gauged by induced attenuation under prescribed test conditions.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode. Unless otherwise noted herein, a wavelength of 1550 nm is the reference wavelength.

The optical fiber 10 disclosed herein comprises a core 20 and a cladding layer (or cladding) 200 surrounding and directly adjacent the core. The cladding 200 has a refractive index profile, $\Delta_{CLAD}(r)$. In some embodiments, the cladding 200 consists of pure silica. In some embodiments, the one or more region of the cladding 200 includes additional dopants. Preferably, at least one cladding region includes a plurality of voids (also referred to as holes herein). These voids may be filled with gas.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber disclosed herein is non-negative from the centerline to the inner radius of the annular segment, $R_2$. In some embodiments, the optical fiber contains no index-decreasing dopants in the core.

Figure 1B:
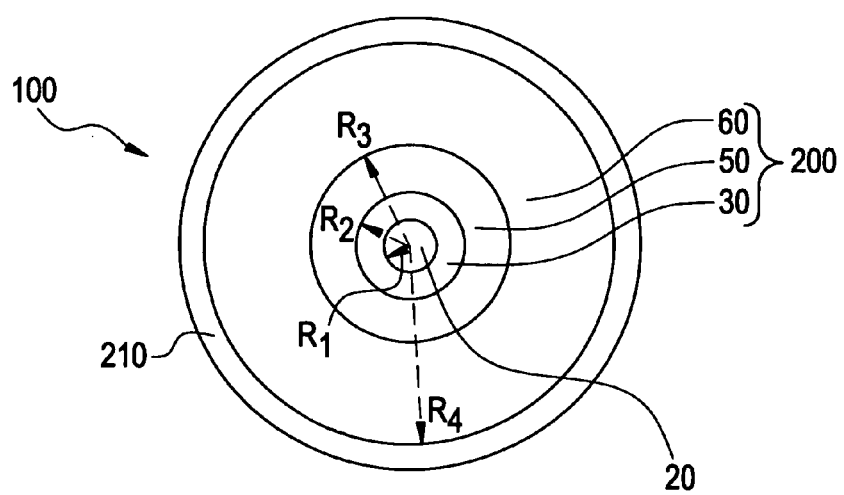
FIG. 1B is a schematic cross-sectional view of an embodiment of an optical waveguide fiber as disclosed herein.

Referring to FIGS. 1A and 1B, optical waveguide fibers 10 are disclosed herein which comprise: a core 20 extending radially outwardly from the centerline to a central segment outer radius, $R_1$, and having a relative refractive index profile, $\Delta_1(r)$ in %, with a maximum relative refractive index percent, $\Delta_{1MAX}$; and, a cladding 200 surrounding and directly adjacent, i.e. in direct contact with, the core 20. Cladding 200 comprises: a first annular region 30 surrounding the core 20 and directly adjacent thereto, extending radially outwardly to a second annular region 50 and characterized by radius $R_2$, this region 30 having a width $W_2$ disposed at a midpoint $R_{2MID}$, and a relative refractive index profile, $\Delta_2(r)$ in %, with a maximum relative refractive index percent, $\Delta_{2MAX}$, in %, a minimum relative refractive index percent, $\Delta_{2MIN}$, in %, and a maximum absolute magnitude relative refractive index percent, $|\Delta_2(r)|_{MAX}$; a second annular region 50 surrounding region 30 and directly adjacent thereto, and extending radially outwardly from $R_2$ to an radius $R_3$, the region 50 having a width $W_3$ disposed at a midpoint $R_{3MID}$, and having a relative refractive index profile, $\Delta_3(r)$ in %, with a minimum relative refractive index percent, $\Delta_{3MIN}$, in %, wherein $\Delta_{1MAX}>0>\Delta_{3MIN}$; and a third annular region 60 surrounding the region 50 and directly adjacent thereto and having a relative refractive index percent, $\Delta_{CLAD}(r)$ in %. $R_1$ is defined to occur at the radius where $\Delta_1(r)$ first reaches +0.05%. That is, core 20 ends and the annular region 30 starts where the relative refractive index first reaches +0.05% (going outward radially) at a radius $R_1$, and region 30 is defined to end at a radius $R_2$ where the relative refractive index $\Delta_2(r)$ first reaches −0.05%, going outward radially. The second annular region 50 begins at $R_2$ and ends at $R_3$ for this group of embodiments. $R_3$ is defined to occur where the relative refractive index $\Delta_3(r)$ reaches the value of −0.05% (going outward radially), after $\Delta_3(r)$ has dipped to at least −0.05%. The width $W_3$ of the annular segment is $R_3-R_2$ and its midpoint $R_{3MID}$ is $(R_2+R_3)/2$. In some embodiments, more than 90% of the radial width of the central segment has a positive relative refractive index, and in some embodiments $\Delta_1(r)$ is positive for all radii from 0 to $R_1$. In some embodiments, $|\Delta\Delta_2(r)|<0.025\%$ or $|\Delta_{2\,max}-\Delta_{2\,min}|<0.05\%$ for more than 50% of the radial width of the first annular region 30, and in other embodiments $|\Delta_2(r)|<0.01\%$ for more than 50% of the radial width of the first annular region 30. $\Delta_3(r)$ is negative for all radii from $R_2$ to $R_3$. Preferably, $\Delta_{CLAD}(r)=0\%$ for all radii greater than 30 μm. The core ends and the cladding begins at a radius $R_{CORE}$. Cladding 200 extends to a radius, $R_4$, which is also the outermost periphery of the glass part of the optical fiber. Also, $\Delta_{1MAX}>\Delta_{2MAX}>\Delta_{3MIN}$, and $\Delta_{MAX}>\Delta_{2MIN}>\Delta_{3MIN}$.

In one set of embodiments, depicted in FIGS. 1A and 1B, the second annular region 50 comprises silica glass having a dopant selected from the group consisting of germanium, aluminum, phosphorus, titanium, boron, and fluorine. In another set of embodiments FIG. 2), the second annular region 50 comprises silica based glass (either pure silica, or silica doped with germanium, aluminum, phosphorus, titanium, boron, and fluorine) with a plurality of closed randomly dispersed holes 16A, the holes being either empty (vacuum) or gas filled, wherein the holes can provide internal reflection of light, thereby providing waveguiding to light traveling along the core. Such holes can provide an effective refractive index which is low compared to pure silica. For example, in some embodiments that utilize the second annular region 50 with dispersed holes 16A $\Delta_{3min}$ is −0.5% to −3%, e.g., −0.7%, −0.8% or −0.9%.

Figure 2:
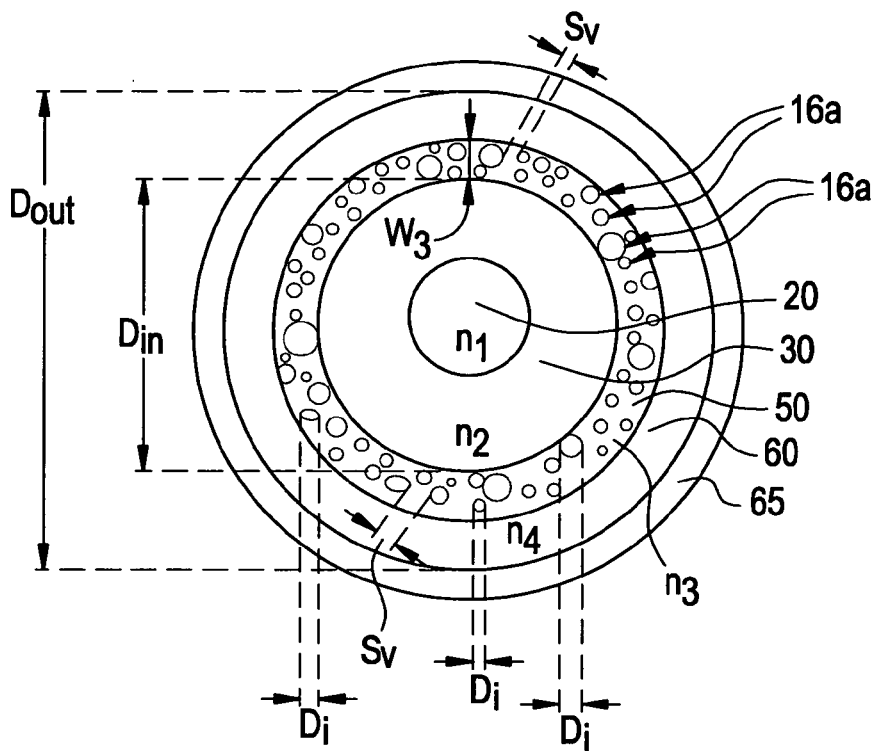
FIG. 2 is a schematic cross-sectional view of an embodiment of an optical waveguide fiber.

More specifically, referring to FIG. 2, the fiber core 20 (for example, a step index core) with maximum refractive index $n_1$, is surrounded by the first annular region 30 (with an index, $n_2$), which is situated adjacent to and is surrounded by the second annular region 50 having radial width, $w_3$, which is further surrounded by a third annular region 60 (with an average or effective index, $n_4$, and a radial width, $w_4$), which can optionally be surrounded by one or more polymer coatings 65. The relative percent index of refraction $\Delta_3(r)$ in second annular region 50 fluctuates between −28% (index of void filled gas relative to that of silica) and that of the glass surrounding the voids (in this example it is silica, with the relative % index of refraction of about 0%). A typical average relative refractive index percent $\Delta_3$ of the second annular region 50 will be between −2% and −3%, relative to pure silica glass, depending on the dopants present in the glass surrounding the voids. That is, the index second annular region 50 fluctuates, and in the example of FIG. 2, the width of the gas filled voids, and/or the glass filled spacing $S_v$ between the gas filled voids (i.e., holes) is randomly distributed and/or are not equal to one another. That is, the voids are non-periodic. It is preferable that the mean distance between the voids is less than 5000 nm, more preferably less than 2000 mm, even more preferably less than 1000 nm, for example 750 nm, 500 nm, 400 nm, 300 nm, 200 nm or 100 nm. Prefer-ably, at least 80%, and more preferably at least 90% of the voids have a maximum cross-sectional dimension Di of less than 1500 nm, more preferably less than 1000 nm, and even more preferably less than 500 nm. Even more preferably, the mean diameter of the voids is less than 1500 nm, preferably less than 1000 nm, more preferably less than 500 nm, and even more preferably less than 300 nm. The voids 16A are closed (surrounded by solid material) and are non-periodic. That is, the voids 16A may have the same size, or may be of different sizes. The distances between voids may be uniform (i.e., the same), or may be different. Preferably the second annular region 50 contains at least 50 holes.

The core 20 has a profile volume, $V_1$, defined herein as:

$$2\int_0^{R_1} \Delta_1(r) r\,dr.$$

The second annular region 50 has a profile volume, $V_3$, defined herein as:

$$2\int_{R_2}^{R_3} \Delta_3(r) r\,dr.$$

Preferably, $\Delta_{1MAX}<0.95\%$, $\Delta_{2MIN}>-0.05\%$, $\Delta_{2MAX}<0.05\%$, $\Delta_{3MIN}<-0.3\%$, $0.15<R_1/R_2<0.6$, and the absolute magnitude of the profile volume of the second annular region, $|V_3|$, is greater than 20%-μm². More preferably, $\Delta_{3MIN}<-0.45\%$, and even more preferably $\leq-0.7\%$. Preferably $0.1<R_1/R_2<0.6$. In some embodiments, $0.1<R_1/R_2<0.5$. When we say, for example, $\Delta<-0.63\%$, we mean A is more negative than −0.63%.

Preferably, in some embodiments, $W_2>\tfrac{2}{3}R_1$, and in some embodiments $W_2>2$ μm.

In some embodiments, 20%-μm²<|V_3|<80%-μm². In other embodiments, 30%-μm²<|V_3|<70%-μm². In other embodiments, 40%-μm²<|V_3|<60%-μm².

In some cases, preferably, $0.2\%<\Delta_{1MAX}<0.8\%$, in other cases, preferably $0.20\%<\Delta_{1MAX}<0.50\%$, or $0.2\%<\Delta_{1MAX}<0.45\%$.

Preferably, $R_1<5.0$ μm, more preferably more preferably 1.6 μm<$R_1$<3.50 μm, even more preferably 2.7 μm<$R_1$<5.0 μm, and in some embodiments 2.7 μm<$R_1$<3.5 μm.

Preferably, $R_2>5$ μm, more preferably >8 μm and even more preferably >12 μm, and in some embodiments 25 μm>$R_2$>5 μm, for example 15.0 μm<$R_2$<25.0 μm. In some embodiments 0.1<$R_1/R_2$<0.4.

Preferably, $R_3 > 15.0$ µm, and in some embodiments $18.0$ µm $< R_3 < 28.0$ µm.

In some embodiments $W_3 > 1.0$ µm, and in other embodiments $1.0 < W_3 < 10$ µm, in some embodiments less than 8.0 µm, and in other embodiments $2.0 < W_3 < 5.0$ µm.

Preferably, $R_4 > 40$ µm. In some embodiments, $R_4 > 50$ µm. In other embodiments, $R_4 > 60$ µm. In some embodiments, $60$ µm $< R_4 < 70$ µm.

In some embodiments, the central segment of the core may comprise a relative refractive index profile having a so-called centerline dip which may occur as a result of one or more optical fiber manufacturing techniques. For example, the central segment may have a local minimum in the refractive index profile at radii less than 1 µm, wherein higher values for the relative refractive index (including the maximum relative refractive index for the core segment) occur at radii greater than r=0 µm.

Preferably, the optical fiber disclosed herein provides: a mode field diameter at 1310 nm of 8.20 µm to 9.50 µm, more preferably 8.4 µm to 9.20 µm; a zero dispersion wavelength between 1380 nm and 1445 nm (for example 1400 nm, 1410 nm, 1420 nm, 1425 nm, 1430 nm); and a cable cutoff wavelength less than 1500 nm, and more preferably less than 1400, even more preferably less than 1300 nm, even more preferably less than 1260 nm, for example 1100 nm or less. As the cable cutoff wavelength is not more than (and in some embodiments about equal to) the 2 m fiber cutoff wavelength, a 2 m fiber cutoff wavelength of less than 1260 nm results in a cable cutoff wavelength less than 1260 nm.

$1^{st}$ Set of Embodiments

Tables 1-2 list characteristics of illustrative examples, Examples 1-8, of a first set of embodiments. The refractive index profiles of Examples 2-8 are similar to FIG. 1A with the following respective values.

TABLE 1

| Example | 1 | 2 | 3 | 4 | 5 | 6 | 7 | 8 |
|---|---|---|---|---|---|---|---|---|
| $\Delta_{1MAX}$ (%) | 0.3646 | 0.364 | 0.3646 | 0.377 | 0.329 | 0.335 | 0.329 | 0.321 |
| R1 (µm) | 2.91 | 2.94 | 2.91 | 2.7 | 3 | 3.13 | 3 | 2.95 |
| V1 (µm² %) | 3.09 | 3.15 | 3.09 | 2.75 | 2.96 | 3.28 | 2.96 | 2.79 |
| R2 (µm) | 19.98 | 19 | 19.98 | 14 | 19 | 18 | 22 | 18 |
| R1/R2 | 0.15 | 0.15 | 0.15 | 0.19 | 0.16 | 0.17 | 0.14 | 0.16 |
| R2MID (µm) | 11.45 | 10.97 | 11.45 | 8.35 | 11.00 | 10.57 | 12.50 | 10.48 |
| W2 (µm) | 17.07 | 16.06 | 17.07 | 11.30 | 16.00 | 14.87 | 19.00 | 15.05 |
| W3 (µm) | 3.68 | 2.5 | 3.68 | 2.5 | 2.5 | 3.5 | 7 | 4.5 |
| $\Delta_{3MIN}$ (%) | −0.4159 | −0.5 | −0.5 | −0.5 | −0.5 | −0.5 | −0.5 | −0.5 |
| R3MID | 21.82 | 20.25 | 21.82 | 15.25 | 20.25 | 19.75 | 25.5 | 20.25 |
| $|V3|$ (µm² %) | 66.8 | 50.6 | 80.3 | 38.1 | 50.6 | 69.1 | 178.5 | 91.1 |

TABLE 2

| Example | 1 | 2 | 3 | 4 | 5 | 6 | 7 | 8 |
|---|---|---|---|---|---|---|---|---|
| Theoretical Cutoff (nm) | 929 | 923 | 929 | 869 | 906 | 894 | 907 | 848 |
| Zero Dispersion Wavelength (nm) | 1415 | 1415 | 1415 | 1428 | 1407 | 1408 | 1407 | 1416 |
| MFD in microns, at 1310 nm | 8.4 | 8.4 | 8.4 | 8.3 | 8.9 | 8.8 | 8.9 | 9.1 |
| Aeff at 1310 nm (µm²) | 52.7 | 52.9 | 52.7 | 51.6 | 58.7 | 58.2 | 58.7 | 61.8 |
| Dispersion at 1310 nm (ps/nm/km) | −7.8 | −7.9 | −7.8 | −9.6 | −7.3 | −7.7 | −7.4 | −8.6 |
| Slope at 1310 nm (ps/nm²/km) | 0.082 | 0.082 | 0.082 | 0.087 | 0.084 | 0.084 | 0.083 | 0.087 |
| MFD in microns, at 1550 nm | 10.4 | 10.4 | 10.4 | 10.4 | 11.1 | 11.1 | 11.1 | 11.6 |
| Aeff at 1550 nm (nm²) | 80.3 | 80.8 | 80.4 | 80.5 | 90.9 | 90.7 | 91.4 | 100.8 |
| Dispersion at 1550 nm (ps/nm/km) | 8.8 | 8.9 | 8.8 | 9.2 | 10 | 10 | 9.6 | 10 |
| Slope at 1550 nm (ps/nm²/km) | 0.063 | 0.064 | 0.063 | 0.074 | 0.066 | 0.068 | 0.064 | 0.073 |
| Kappa at 1550 nm (nm) | 141 | 139 | 140 | 125 | 150 | 146 | 150 | 137 |
| Dispersion at 1440 nm (ps/nm/km) | 1.7 | 1.7 | 1.7 | 0.9 | 2.4 | 2.3 | 2.4 | 1.8 |
| bend loss at 1550 nm using 1 wrap on a 20 mm diameter mandrel | 2.1 | 2.4 | 1.1 | 1.0 | 5.2 | 1.4 | 0.3 | 0.9 |
| 20 mm relative bend loss at 1550 nm) | 2.1 | 2.4 | 1.1 | 1.0 | 5.2 | 1.4 | 0.3 | 0.9 |

By changing the five parameters, desired optical performance can be obtained. We have scanned the parameter space with the following ranges using the computer modeling profile design tools: $\Delta_{1MAX}$=0.255% to 0.95%, $R_1$=1.68 µm to 3.42 µm, $\Delta_{3MIN}$<−0.30%, $R_2$=5 µm to 25 µm, $W_3$=2 µm to 10 µm.

Preferably the dispersion is 1-12 ps/nm/km, more preferably 6-12 ps/nm/km, which corresponds to effective area (at 1550 nm) range of about 60 µm² to about 140 µm² or larger. Preferably, the effective area of the fiber is at least 70 µm² and more preferably at least 75 µm², even more preferably at least 80 µm², or at least 100 µm². A typical range of effective areas is about 80 µm² to about 100 µm² or to about 110 µm². It is preferred that the kappa, which is the ratio between the dispersion and the dispersion slope, at 1550 nm to be greater than 120 nm. For using the fiber in Raman application, it is preferred that the dispersion at 1440 nm to be greater than 0.8 ps/nm/km. In the effective area range of 60 to 140 µm² the dispersion slope is between 0.055 and 0.1 ps/nm²/km. One advantage of the design is that the theoretical cutoff wavelength for the core is (preferably) lower than 1200 nm, making this design suitable for both the 1310 nm and 1550 nm windows. However, a practical design selection is also dependent on the bending loss requirement. The bending loss can be improved by choosing the volume of the second annular region, which is defined as the product of the cross sectional area of the second annular region's sectional area and absolute value of delta $V_{3min}$ in percent. The volume of the second annular region affects actual fiber and cable cutoff wavelengths. To have a cable cutoff wavelength less than 1500 nm, it is preferable that e $|V_3|$, the absolute value of the volume of the second annular region be less than 80%-μm². If the volume $|V_3|$ of the second annular region is greater than 80%-μm², the cable cutoff wavelength may be longer than 1500 nm, or even longer than 1550 nm. However, because the theoretical cutoff wavelength for the core is below 1200 nm, this kind of fiber can be still used in the single mode fiber systems by using standard single mode fiber launching and receiving technique to ensure single mode operation. These fibers have zero dispersion at wavelengths between about 1400 and 1445 nm.

In some embodiments, such as Examples 1-8, the exemplary optical fibers exhibit mode field diameter at 1310 nm of 8.30 μm to 9.10 μm; a zero dispersion wavelength between 1407 and 1428 nm; and preferably, the theoretical cutoff wavelength of less than 1100 nm, dispersion at 1440 nm greater than 0.8 ps/nm/km and preferably between 0.9 and 2.4 ps/nm/km, and kappa at 1550 nm of greater than 120 and, for example, between about 125 nm and 150 nm. The cable cutoff wavelengths for all the examples are less than 1500 nm. The effective area of the fibers of examples 1-8 at 1550 nm exhibits values between about 80 μm and about 100 μm².

The optical fibers disclosed herein exhibit superior bend resistance, both macrobend and microbend. In order to predict the macrobending performance of the fibers, we have used the finite element method to model the bending properties of the optical waveguide. The scheme is based on fully vectorial Maxwellian equations. The bending of an optical fiber is considered as geometrical distortion as described by the conformal transformation that was described in the reference by M. Heiblum, and J. H. Harris, "Analysis of curved optical waveguides by conformal transformation", IEEE J. Quantum Electronics, QE-11, (2), 75-83 (1975). The curved fiber is replaced by a straight fiber with equivalent refractive index distribution, $$n_{eq}(x, y) = n(x, y)\exp\left(\frac{p}{R}\right) \quad (1)$$

where p=x or y, depending on the bending direction, and R stands for the effective bend radius. In the modeling, the bending direction is always chosen to be in the x direction. When a fiber is bent, the refractive index is tilted. The cladding index in certain regions can be higher than the index in the core. This results in leaky mode loss for the core modes. The loss of the optical wave due to the infinite space in the direction normal to the interface of the fiber outer surface can be emulated by perfectly matched layer (PML) outside the fiber, which has been described in Reference by Jianming Jin, "The finite element method in electromagnetics", Wiley Inerscience, (2002). In our modeling, we have implemented the PML in the cylindrical coordinate system. We obtain the complex effective index for each mode. The effective index of each mode is then converted into the effective propagation constant, β, which is related to the effective index in a simple relation, $$\beta = \frac{2\pi}{\lambda}n_{eff}.$$

The imaginary part of the propagation is related to the leaky mode loss in an equation defined as follows, $$\alpha = \frac{20}{\ln(10)}\text{Im}(\beta) \quad (2)$$

The leaky mode loss α is in the unit of dB/m. Modeling results showed bend loss of fibers wrapped around a 20 mm diameter mandrel, measured at 1550 nm, of less than 6 dB/turn In some embodiments, as exhibited by Example 1-8, the predicted bending loss is between 0.3 and 5.2 dB/turn. In some embodiments, the bend loss was less than 2.5 dB/turn, in some embodiments less than 1 dB/turn, and in some embodiments less tan 0.5 dB/turn, when measured at 1550 nm on a 20 mm diameter mandrel. We also conducted a comparison of the modeling results with the existing measurement results on fibers such as SMF-28e®, to gain insight on how we can utilize the bending modeling to judge a fiber's relative bending performance compared to a standard single mode fiber such as SMF-28e®, manufactured by Corning, Inc. Note that the bending loss of the commercially available SMF-28e® fiber is well characterized, with induced losses of about 1 dB/turn at a bend diameter of 20 mm and a wavelength of 1550 nm. The relative bending loss of the suggested fibers to the commercial SMF-28e® fiber is thus used to gauge the bending performance of the suggested fibers. For example, when the relative bending loss is 1, it means that the fiber has the same bending loss as SMF-28e® fiber at the specified bending diameter and wavelength. In some embodiments, as exhibited by Example 1-8, the predicted bending loss relative to the SMF-28e® fiber is between 0.3 and 5.2. The bending performance can be also optimized by changing the location of the second annular region 50. In Example 4, the second annular region 50 starts at 14 μm radial position. Although the volume of the second annular region 50 is smaller than Example 3, the bending loss is about the same. However, moving the second annular region closer to the center of the core can have the effect of increasing the dispersion and slope. Examples 1-4 have an effective area around 80 μm². The effective area can be increased further by reducing the core delta. This is shown in Example 5 which has a core delta of 0.329%. The effective area of the optical fiber of example 5 is 90.9 μm². This fiber has a second annular region which is the same as the fiber of Example 2, but bending loss of the fiber of Example 5 is about 2.5 times higher than that of the fiber of example 2. The bending loss is improved by increasing the volume of the second annular region 50 as shown in fibers of Examples 6 and 7. Examples 6 and 7 correspond to the optical fibers that have a core similar to that of the optical fiber of Example 5, but a thicker second annular region of (3.5 μm and 7 μm respectively). The 20 mm diameter relative bending loss of these fibers (examples 6 and 7) is reduced to 1.4 and 0.3, respectively. However, when the volume of the second annular region is too high, it may trap light inside, making the fiber multimoded. In this case, because the core is still single moded, we can still use a single mode launch technique to ensure single mode operation. By single mode launch technique, we mean that the optical signal is launched into the transmission fiber through a standard single mode fiber and another single mode fiber is used to couple of the output end of the transmission fiber to the receiver. Preferably the standard single mode and transmission fibers are sufficiently well-aligned to yield splice losses less than 0.5 dB, more preferably less than 0.3 dB.

The LP11 theoretical cutoff wavelength of the exemplary fibers is less than 1300 nm, preferably less than 1250 nm, and even more preferably less than 1200 nm. As illustrated by Examples 1-8, The LP11 theoretical cutoff wavelength is less than 1100 nm. We have also found that for a given core profile, increasing the magnitude of the profile volume, $|V_3|$, without limit causes the cutoff wavelength to increase to the point that the optical fiber is multimoded at 1310 nm or even at 1550 nm. Accordingly, in some embodiments, $20\%\text{-}\mu m^2 < |V_3| < 80\%\text{-}\mu m^2$, in other embodiments $30\%\text{-}\mu m^2 < |V_3| < 70\%\text{-}\mu m^2$, and in other embodiments $40\%\text{-}\mu m^2 < |V_3| < 60\%\text{-}\mu m^2$.

We have also found that a higher core volume generally not only tends to increase the size of the mode field, but also raises the LP11 theoretical cutoff wavelength, and therefore tends to raise the 2 m fiber cutoff wavelength. In some embodiments, the profile volume of the core, V1, is greater than 0 and less than $6.5\%\text{-}\mu m^2$, in other embodiments less than $6.2\%\text{-}\mu m^2$, and in some embodiments, such as Examples 1-7, $V_1$ is between 5.50 and $6.00\%\text{-}\mu m^2$ The core fiber 20 of the optical fiber 10 shown in FIGS. 1A, 1B has a refractive index profile either has a step shape, or a rounded step shape or an alpha shape with the alpha taking a finite value. However, the core 20 could have other values of $\alpha_1$, or the core could have a profile shape other than an alpha profile, such as a multi-segmented core, which will be additional examples presented below.

Example 9

Figure 3:
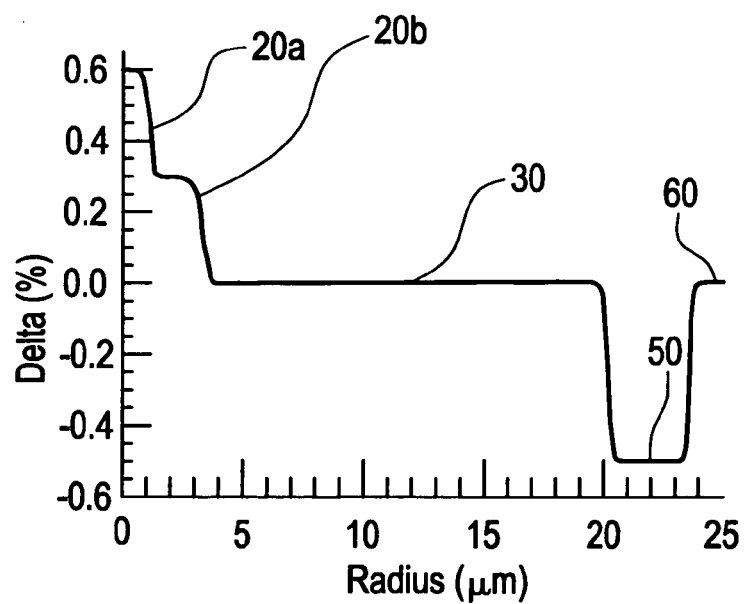
FIG. 3 shows a relative refractive index profile of another embodiment of an optical waveguide fiber as disclosed herein.

With reference to FIG. 3, in this example of fiber 10, the fiber core is divided into two parts 20A and 20B with the first segment 20A having a higher delta and the remaining core segment 20B taking an alpha shape with the alpha of about 10. This fiber has dispersions of 8.0 ps/nm/km at 1550 nm and −9.4 ps/nm/km at 1310 nm. The MFD of this fiber is 10.1 μm at 1550 nm and 8.2 μm at 1310 nm. The effective area is 75.8 μm at 1550 nm and 49.0 μm at 1310 nm. The zero dispersion wavelength is 1431 nm. Dispersion slope is 0.0657 ps/nm²/km at 1550 nm and 0.087 ps/nm²/km at 1310 nm. The kappa value is 124 nm at 1550 nm and −108 nm at 1310 nm. The dispersion of this fiber is 0.68 ps/nm/km at 1440 nm. The relative bending loss at 20 mm bending diameter at 1550 nm is 0.31 dB/turn.

Example 10

With reference to the FIG. 2 depicting airlines (voids) in the fiber region 50 (corresponding to $W_3$), this exemplary fiber has $\Delta_{1MAX}$ of 0.377%; $R_1$ of 2.7 microns; $V_1$ of 2.75 microns 2%; $R_2$ of 14 microns; $R_1/R_2$ of 0.19; $R_{2MID}$ of 8.35 microns; $W_2$ of 11.30 microns; $W_3$ of 2.5 microns. The voids 16A of annular region 50 contain argon. The annular region 50 begins at a radius of 14 microns radius and has a radial width of 2.5 microns. This region 50 comprises silica containing, in % of area cross-section, 6% voids (having a mean hole diameter of 300 nm with a standard deviation of 100 nm) and approximately 200 holes as view in fiber cross-section. Optical properties for this fiber are: Theoretical Cutoff wavelength of 869 nm; Zero Dispersion Wavelength of 1428 nm; MFD at 1310 nm 8.3 microns; Aeff at 1310 nm of 51.6 microns²; Dispersion at 1310 nm of −9.6 ps/nm/km; Slope at 1310 nm of 0.087 ps/nm²/km; MFD at 1550 nm of 10.4 microns, Aeff at 1550 nm of 80.5 microns²; Dispersion at 1550 nm of 9.2 ps/nm/km; Slope at 1550 nm of 0.074 ps/nm²/km; Kappa at 1550 nm of 125 nm; Dispersion at 1440 nm of 0.9 ps/nm/km; 20 mm bend loss at 1550 nm of 0.3 dB/turn.

Examples 11-14

Figure 4A:
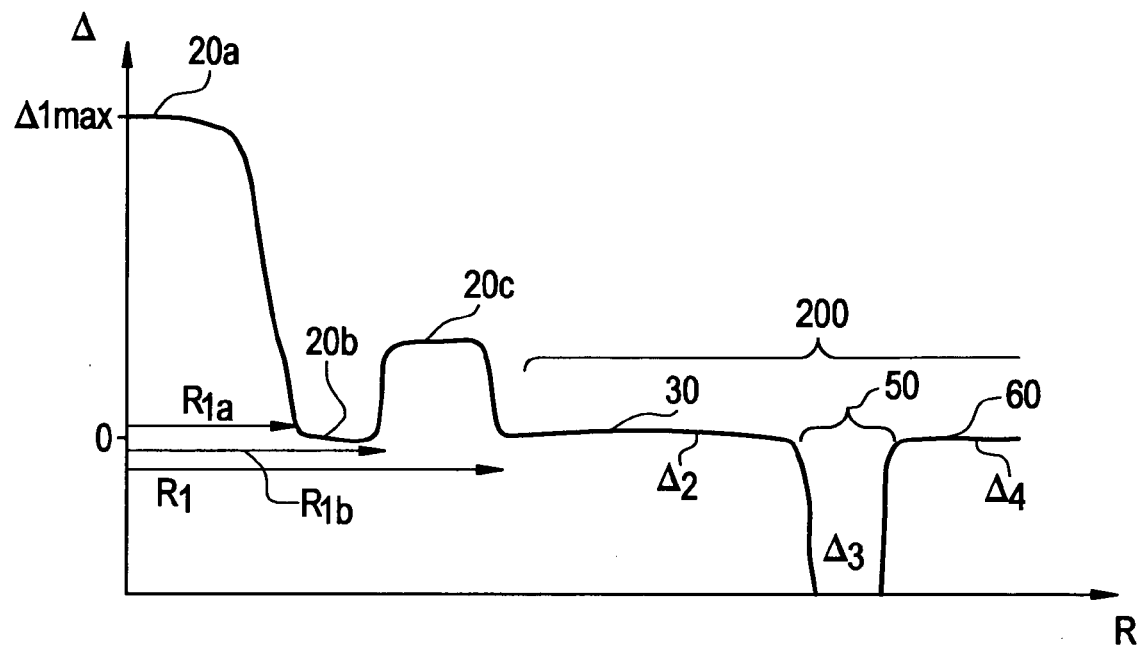
FIG. 4A shows a relative refractive index profile of yet another embodiment of an optical waveguide fiber.
Figure 4B:
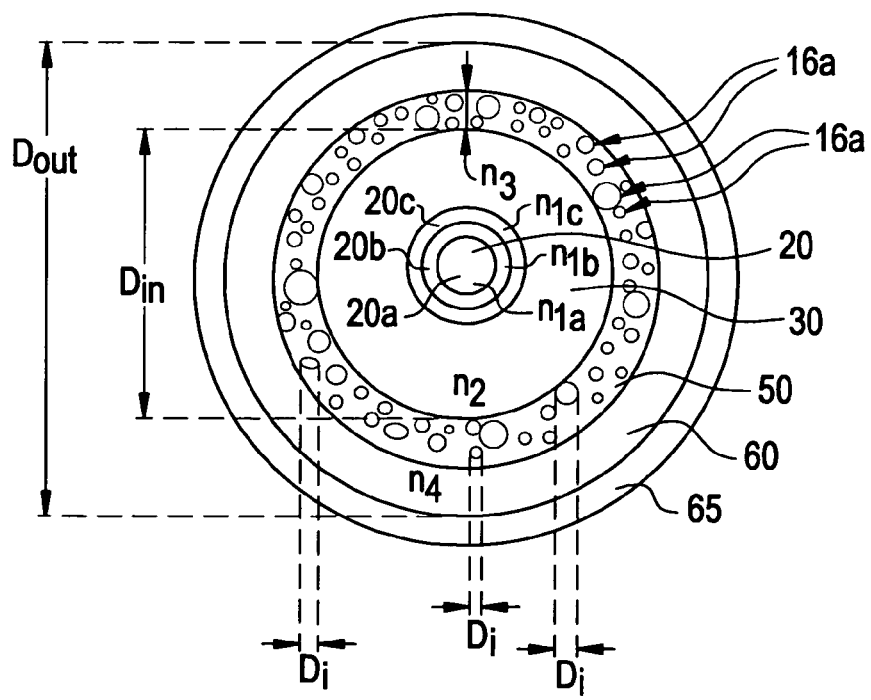
FIG. 4B is a schematic cross-sectional view of an embodiment of an optical waveguide fiber of FIG. 4A.

With reference to the FIGS. 4A, 4B depicting airlines (voids) in the fiber region 50 (corresponding to $W_3$), this set of exemplary fibers has a segmented core 20. More specifically, the core 20 has three annular segments: the center segment 20a characterized by maximum index delta $\Delta_{1aMAX}$ (which is the same as $\Delta_{1MAX}$) and radius $R_{1a}$; core segment 20b surrounding the segment 20a and characterized by $\Delta_{1bMAX}$ and radius $R_{1b}$; and a segment 20c surrounding the segment 20b and characterized by $\Delta_{1cMAX}$ and radius $R1c$ which is the same radius as $R_1$. The core segment 20c is situated adjacent to and is surrounded by the fiber cladding 200.

One exemplary fiber 10 has $\Delta_{1aMAX}$ of 0.431%; $R_{1a}$ of 3.6 microns; $\Delta_{1bMAX}$ of 0.0%; $R_{1b}$ of 5.7 microns; $\Delta_{1cMAX}$ of 0.125%; $R_1$ of 8.8 microns; $R_2$ of 15.7 microns; $R_1/R_2$ of 0.57; $R_{2MID}$ of 12.4 microns; $W_2$ of 6.8 microns; $W_3$ of 2.1 microns. In this exemplary fiber 10 voids 16A of the annular region 50 contain argon. The annular region 50 begins at a radius of 14 microns radius and has a radial width of 2.5 microns. This region 50 comprises silica containing area with 6% voids (% of area cross-section for the region 50) or holes (the voids having a mean hole diameter of 300 nm with a standard deviation of 100 nm) and approximately 200 holes viewed in fiber cross-section. Optical properties for this fiber are: Theoretical Cutoff wavelength of 1324 nm; Zero Dispersion Wavelength of 1415 nm; MFD at 1310 nm 8.18 microns; Aeff at 1310 nm of 50.5 microns²; Dispersion at 1310 nm of −8.2 ps/nm/km; Slope at 1310 nm of 0.082 ps/nm²/km; MFD at 1550 nm of 10.0 microns, Aeff at 1550 nm of 75.3 microns²; Dispersion at 1550 nm of 9.6 ps/nm/km; Slope at 1550 nm of 0.070 ps/nm2/km; Kappa at 1550 nm of 137 nm; Dispersion at 1440 nm of 1.8 ps/nm/km.

Tables 3 and 4, below, list parameters of the illustrative examples 11-14, which examples are similar to that illustrated in FIGS. 4A-4B.

TABLE 3

| | Example | | | |
|---|---|---|---|---|
| | 11 | 12 | 13 | 14 |
| $\Delta_{1aMAX}$(%) | 0.433 | 0.431 | .445 | .417 |
| R1a(μm) | 3.869 | 3.434 | 3.372 | 3.49 |
| $\Delta_{1bMAX}$(%) | 0 | 0 | 0 | 0 |
| R1b(μm) | 6.16 | 5.67 | 5.98 | 5.99 |
| $\Delta_{1cMAX}$(%) | 0.101 | 0.125 | 0.115 | 0.119 |
| R1(μm) | 9.69 | 8.81 | 9.45 | 9.19 |
| V1 (μm²-%) | 9.8 | 9.1 | 9.6 | 9.2 |
| R2 (μm) | 13.61 | 15.98 | 14.11 | 15.97 |
| R1/R2 | 0.71 | 0.55 | 0.67 | 0.58 |
| R2MID (μm) | 11.65 | 12.4 | 11.78 | 12.58 |
| W2 (μm) | 3.92 | 7.17 | 4.66 | 6.78 |
| W3 (μm) | 1.99 | 1.49 | 1.68 | 2.01 |
| $\Delta_{3MIN}$(%) | −1.0 | −1.0 | −1.0 | −1.0 |
| R3MID | 14.6 | 16.73 | 14.95 | 16.98 |
| $|V3|$ (μm² %) | 58.2 | 49.8 | 50.2 | 68.2 |

TABLE 4

| | Example | | | |
|---|---|---|---|---|
| | 11 | 12 | 13 | 14 |
| Theoretical Cutoff (nm) | 1290 | 1324 | 1291 | 1316 |
| Zero Dispersion Wavelength (nm) | 1377 | 1415 | 1422 | 1411 |
| MFD in microns, at 1310 nm | 8.2 | 8.2 | 7.9 | 8.3 |
| Aeff at 1310 nm ($\mu m^2$) | 50.7 | 50.5 | 47.7 | 51.7 |
| Dispersion at 1310 nm (ps/nm/km) | −5.3 | −8.2 | −8.3 | −7.8 |
| Slope at 1310 nm (ps/nm$^2$/km) | 0.082 | 0.082 | 0.079 | 0.082 |
| MFD in microns, at 1550 nm | 9.7 | 10.0 | 9.7 | 10.1 |
| Aeff at 1550 nm ($\mu m^2$) | 70.7 | 75.3 | 70.6 | 77.1 |
| Dispersion at 1550 nm (ps/nm/km) | 11.7 | 9.55 | 8.9 | 9.75 |
| Slope at 1550 nm (ps/nm$^2$/km) | 0.065 | 0.070 | 0.069 | 0.069 |
| Kappa at 1550 nm (nm) | 180 | 137 | 129 | 141 |
| Dispersion at 1440 nm (ps/nm/km) | 4.4 | 1.8 | 1.3 | 2.1 |

Preferably, the optical fibers disclosed herein have low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Pat. No. 6,904,772, and PCT Application Publication No. WO01/47822.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein. The optical transmission line may also comprise a section of a second optical fiber having a negative dispersion at a wavelength of about 1550 nm, for example to effect dispersion compensation within the optical transmission line. Optical transmission line 100 comprises a first fiber which is a low attenuation large effective area optical fiber as disclosed herein, and a second optical fiber having a negative dispersion at 1550 nm. The first fiber and second fiber may be optically connected by a fusion splice, an optical connector or the like. The optical transmission line may also comprise one or more components and/or other optical fiber(s) (for example one or more "pigtail fibers" at junctions between fibers and/or components). In preferred embodiments, at least a portion of the second optical fiber is optionally disposed within a dispersion compensating module. Optical transmission line allows transmission of an optical signal between transmitter and receiver. The system preferably further comprises at least one amplifier, such as a Raman amplifier, optically coupled to the optical fiber section. The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 nm and 1565 nm. In one embodiment, the transmission system utilizing the fiber operates at: at least 40 Gbits/sec with ether (i) time division multiplexing (TDM) transmission, or (ii) wavelength division multiplexing. Therefore, according to some embodiments, the optical transmission system comprises a transmitter, a receiver and an optical fiber according to the present invention situated there between, the fiber having a data transmission rate of at least 40 Gbit/sec.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:
1. An optical fiber comprising:
 a glass core extending from a centerline to a radius $R_1$, wherein $R_1 < 5$ μm;
 a glass cladding surrounding and in contact with the core, the cladding comprising:
  a first annular region extending from a radius $R_1$ to a radius $R_2$, the first annular region comprising a radial width, $W_2 = R_2 - R_1$,
  a second annular region extending from the radius $R_2$ to a radius $R_3$, and comprising a radial width, $W_3 = R_3 - R_2$, and
  a third annular region surrounding the second annular region and extending from the radius $R_3$ to an outermost glass radius $R_4$;
 wherein the core comprises a maximum relative refractive index, $\Delta_{1MAX}$, relative to the third annular region; wherein said first annular region comprises index delta $\Delta_2(r)$ relative to the third annular region; the second annular region comprises:
  a minimum relative refractive index, $\Delta_{3MIN}$, relative to the third annular region;
 wherein $\Delta_{1MAX} > \Delta_{2MAX} > \Delta_{3MIN}$, and $\Delta_{2MIN} > \Delta_{3MIN}$ and $\Delta_{3MIN} < -0.025$; and
 wherein the core and the cladding provide a fiber with cable cutoff less than 1500 nm, dispersion at 1550 nm less than 12 ps/nm/km, and an effective area at 1550 nm greater than 80.3 μm$^2$.

2. An optical transmission system comprising a transmitter, a receiver and an optical fiber of claim 1 situated there between, said fiber having a data transmission rate of at least 40 Gbit/sec.

3. An optical fiber comprising:
a glass core extending from a centerline to a radius $R_1$;
a glass cladding surrounding and in contact with the core, the cladding comprising:
a first annular region extending from a radius $R_1$ to a radius $R_2$, the first annular region comprising a radial width, $W_2 = R_2 - R_1$,
a second annular region extending from the radius $R_2$ to a radius $R_3$, and comprising a radial width, $W_3 = R_3 - R_2$, and
a third annular region surrounding the second annular region and extending from the radius $R_3$ to an outermost glass radius $R_4$;
wherein the core comprises a maximum relative refractive index, $\Delta_{1MAX}$, relative to the third annular region, and wherein $\Delta_{1MAX}$ is greater than about 0.2% and less than about 0.8%;
wherein refractive index delta $\Delta_2(r)$ of said first annular region is less than about 0.025%;
wherein the second annular region comprises a minimum relative refractive index, $\Delta_{3MIN}$, relative to the third annular region;
wherein $\Delta_{1MAX} > \Delta_{2MAX} > \Delta_{3MIN}$, and $\Delta_{2MIN} > \Delta_{3MIN}$ and $\Delta_{3MIN} < -0.025$; and
wherein the core and the cladding provide a fiber with cable cutoff less than 1500 nm, dispersion at 1550 nm less than 12 ps/nm/km and dispersion value D at the wavelength of 1440 nm greater than 0.8 ps/nm/km, and an effective area at 1550 nm greater than 70 µm².

4. The optical fiber according to claim 3, wherein the first annular region has a radial width, $W_2$ that is larger than $\frac{2}{3} R_1$; and wherein the effective area at 1550 nm is greater than 80.3 µm₂.

5. The optical fiber according to claim 3, wherein said core comprises three core regions, the first core region being a central region having a maximum refractive index delta $\Delta_{1aMAX}$ of greater than about 0.2% and less than about 0.55%, a second core region abutting to and surrounding the first core region, said second region having a maximum refractive index delta $\Delta_{1bMAX}$ of less than about 0.05%, a third core region abutting to and surrounding the second core region, said third region having a maximum refractive index delta $\Delta_{1cMAX}$ greater than about 0.05% and less than about 0.2%.

6. The optical fiber of claim 5, wherein said second annular region comprises silica based glass with at least 50 closed randomly dispersed holes situated therein, and (i) mean distance between the air holes is less than 5000 nm, and (ii) at least 80% of the holes have a maximum cross-sectional dimension Di of less than 1500 nm.

7. The optical fiber of claim 3, wherein the zero dispersion wavelength is between about 1400 nm and 1440 nm.

8. The optical fiber of claim 3, wherein $\Delta_{1MAX}$ is greater than about 0.2% and smaller than about 0.5%.

9. The optical fiber of claim 3, wherein $\Delta_{3MIN}$, relative to the third annular region, wherein $\Delta_{3MIN}$ is less than about −0.3%.

10. The optical fiber of claim 3 wherein the second annular region comprises a profile volume, $V_3$, equal to:

$$2 \int_{R_2}^{R_3} \Delta(r) r \, dr;$$

wherein $|V_3|$ is at least 20% µm².

11. The optical fiber of claim 3 wherein said fiber has a Kappa value at wavelength 1550 nm of greater than 120.

12. The optical fiber of claim 3 wherein the core in combination with the cladding provide a bend loss at 1550 nm wavelength of less than 6 dB/turn on a 20 mm diameter mandrel.

13. The optical fiber of claim 3 wherein 20% µm² > $|V_3|$ < 80% µm².

14. The optical fiber of claim 3 wherein $R_1 < 5.0$ µm, $R_2 > 5$ µm, and $R_3 > 10$µ and $W_3$ is between 1 µm and 10 µm.

15. The optical fiber of claim 3 wherein said effective area is at least 80 µm².

16. The optical fiber of claim 3 wherein the core comprises a profile volume, $V_1$, equal to:

$$2 \int_0^{R_1} \Delta(r) r \, dr;$$

wherein $V_1$ is greater than 0 and less than 6.2% µm².

17. The optical fiber of claim 3 wherein the core and the cladding provide a fiber cutoff less than 1260 nm.

18. The optical fiber of claim 3 wherein the core and the cladding provide a mode field diameter at 1310 nm of between 8.2 and 9.5 µm.

19. The optical fiber of claim 3 wherein the zero dispersion wavelength is between about 1377 nm and 1445 nm.

20. An optical fiber comprising;
a glass core extending from a centerline to a radius $R_1$;
a glass cladding surrounding and in contact with the core, the cladding comprising:
a first annular region extending from a radius $R_1$ to a radius $R_2$, the first annular region comprising a radial width, $W_2 = R_2 - R_1$,
a second annular region extending from the radius $R_2$ to a radius $R_3$, and comprising a radial width, $W_3 = R_3 - R_2$, and
a third annular region surrounding the second annular region and extending from the radius $R_3$ to an outermost glass radius $R_4$;
wherein the core comprises a maximum relative refractive index, $\Delta_{1MAX}$, relative to the third annular region, and wherein $\Delta_{1MAX}$ is greater than about 0.2% and less than about 0.8%;
wherein refractive index delta $\Delta_2(r)$ of said first annular region is less than about 0.025%;
wherein the second annular region comprises a minimum relative refractive index, $\Delta_{3MIN}$, relative to the third annular region;
wherein $\Delta_{1MAX} > \Delta_{2MAX} > \Delta_{3MIN}$, and $\Delta_{2MIN} > \Delta_{3MIN}$ and $\Delta_{3MIN} 21 -0.025$; and
wherein the core and the cladding provide a fiber with cable cutoff less than 1500 nm, dispersion at 1550 nm less than 12 ps/nm/km, and dispersion value D at the wavelength of 1440 nm greater than 0.8 ps/nm/km. and an effective area at 1550 nm greater than 70 µm² wherein said second annular region comprises silica based glass with a plurality of closed randomly dispersed holes situated therein.

21. The optical fiber of claim 20, wherein said second annular region comprises silica based glass with at least 50 closed randomly dispersed holes situated therein, and (i) mean distance between the holes is less than 5000 nm, and (ii) at least 80% of the holes have a maximum cross-sectional dimension Di of less than 1500 nm.

* * * * *